US012284424B2

(12) United States Patent
Zhang (10) Patent No.: US 12,284,424 B2
(45) Date of Patent: Apr. 22, 2025

(54) VIDEO-BASED INFORMATION DISPLAYING METHOD AND APPARATUS, DEVICE AND MEDIUM

(71) Applicant: Beijing Bytedance Network Technology Co., Ltd., Beijing (CN)

(72) Inventor: Baihui Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/465,808

(22) Filed: Sep. 12, 2023

(65) Prior Publication Data

US 2023/0421857 A1    Dec. 28, 2023

Related U.S. Application Data

(63) Continuation of application No. PCT/CN2022/079613, filed on Mar. 7, 2022.

(30) Foreign Application Priority Data

Mar. 12, 2021    (CN) .......................... 202110269050.X (51) Int. Cl.
*H04N 21/478*    (2011.01)
*H04N 21/254*    (2011.01)
(Continued)

(52) U.S. Cl.
CPC ... *H04N 21/47815* (2013.01); *H04N 21/2542* (2013.01); *H04N 21/4316* (2013.01);
(Continued)

(58) Field of Classification Search
CPC ......... H04N 21/47815; H04N 21/2542; H04N 21/4316; H04N 21/47217; H04N 21/4722; H04N 21/8133; H04N 21/858
See application file for complete search history.

(56) References Cited

U.S. PATENT DOCUMENTS 9,177,225 B1     11/2015   Cordova-Diba et al.
11,303,965 B1*   4/2022    Minne .............. H04N 21/47815
(Continued)

FOREIGN PATENT DOCUMENTS

CN    103257798 A    8/2013
CN    103581731 A    2/2014
(Continued)

OTHER PUBLICATIONS

International Search Report and Written Opinion in PCT/CN2022/079613, mailed May 25, 2022, 13 pages.
(Continued)

*Primary Examiner* — John R Schnurr (74) *Attorney, Agent, or Firm* — Astute IP Law Group (57) ABSTRACT

Embodiments of the present disclosure relate to a video-based information displaying method and apparatus, a device and a medium. The method includes: receiving an information display triggering operation of a user in a process of playing back a video; acquiring at least two pieces of target information associated with the video; displaying first target information of the at least two pieces of target information in an information displaying region of a playback page of the video, where a size of the information displaying region is smaller than a size of the playback page; receiving a first switch triggering operation of the user, and switching the first target information displayed in the information displaying region to second target information of the at least two pieces of target information.

19 Claims, 6 Drawing Sheets

(51) Int. Cl.
*H04N 21/431* (2011.01)
*H04N 21/472* (2011.01)
*H04N 21/4722* (2011.01)
*H04N 21/81* (2011.01)
*H04N 21/858* (2011.01)

(52) U.S. Cl.
CPC ... *H04N 21/47217* (2013.01); *H04N 21/4722* (2013.01); *H04N 21/8133* (2013.01); *H04N 21/858* (2013.01)

(56) References Cited

U.S. PATENT DOCUMENTS

| | | | |
|---|---|---|---|
| 2008/0163283 A1* | 7/2008 | Tan | H04N 21/43074 725/20 |
| 2018/0310066 A1 | 10/2018 | Kobayashi et al. | |
| 2019/0318405 A1* | 10/2019 | Hu | G06V 20/00 |
| 2020/0134320 A1* | 4/2020 | Crossley | G06F 9/451 |
| 2020/0381018 A1 | 12/2020 | Pham | G11B 27/036 |
| 2021/0390523 A1* | 12/2021 | Trimble | G06Q 20/123 |
| 2022/0053242 A1* | 2/2022 | Lee | H04N 21/44008 |
| 2022/0198551 A1* | 6/2022 | Song | G06Q 30/0643 |
| 2023/0276099 A1* | 8/2023 | Lee | H04N 21/42204 725/37 |

FOREIGN PATENT DOCUMENTS

| | | |
|---|---|---|
| CN | 105224225 A | 1/2016 |
| CN | 106162213 A | 11/2016 |
| CN | 107145494 A | 9/2017 |
| CN | 108124167 A | 6/2018 |
| CN | 108322806 A | 7/2018 |
| CN | 109391834 A | 2/2019 |
| CN | 110035314 A | 7/2019 |
| CN | 110139161 A | 8/2019 |
| CN | 110620949 A | 12/2019 |
| CN | 305472640 S | 12/2019 |
| CN | 111240573 A | 6/2020 |
| CN | 111353839 A | 6/2020 |
| CN | 111464844 A | 7/2020 |
| CN | 111615007 A | 9/2020 |
| CN | 111726675 A | 9/2020 |
| CN | 306141436 S | 10/2020 |
| CN | 112016986 A | 12/2020 |
| CN | 112019930 A | 12/2020 |
| CN | 112070569 A | 12/2020 |
| CN | 306279022 S | 1/2021 |
| CN | 112465571 A | 3/2021 |
| KR | 20160116193 A | 10/2016 |

OTHER PUBLICATIONS

Office Action mailed Feb. 22, 2023, in CN202110269050.X, with Concise Explanation of Relevance, 11 pages.
Office Action mailed Aug. 30, 2023, in CN202110269050.X, with Concise Explanation of Relevance, 7 pages.

* cited by examiner

VIDEO-BASED INFORMATION DISPLAYING METHOD AND APPARATUS, DEVICE AND MEDIUM

CROSS-REFERENCE TO RELATED APPLICATIONS

This application is a continuation of International Application No. PCT/CN2022/079613 titled "INFORMATION DISPLAY METHOD AND APPARATUS BASED ON VIDEO, AND DEVICE AND MEDIUM", filed on Mar. 7, 2022, which claims the priority to Chinese patent application No. 202110269050.X titled "VIDEO-BASED INFORMATION DISPLAYING METHOD AND APPARATUS, DEVICE AND MEDIUM" and filed with the China National Intellectual Property Administration on Mar. 12, 2021. The above applications are hereby incorporated by reference in their entireties.

TECHNICAL FIELD

The present disclosure relates to the field of information processing technology, and in particular to a video-based information displaying method and apparatus, a device and a medium.

BACKGROUND

With the rapid development of Internet technologies and intelligent terminals, online shopping has become an important part of people's lives.

At present, in some related products, a user can acquire information of a related product displayed in a video while watching the video, but if there are multiple related products in a video, the effect of information displaying cannot meet the demand.

SUMMARY

In order to solve the above technical problems or at least partly solve the above technical problems, the present disclosure provides a video-based information displaying method and apparatus, an electronic device, a storage medium, a computer program product and a computer program.

An embodiment of the present disclosure provides a video-based information displaying method, including:
  receiving an information display triggering operation of a user in a process of playing back a video;
  acquiring at least two pieces of target information associated with the video;
  displaying first target information of the at least two pieces of target information in an information displaying region of a playback page of the video, where a size of the information displaying region is smaller than a size of the playback page;
  receiving a first switch triggering operation of the user, and switching the first target information displayed in the information displaying region to second target information of the at least two pieces of target information.

An embodiment of the present disclosure also provides a video-based information displaying apparatus, including:
  a display triggering module, configured to receive an information display triggering operation of a user in a process of playing back a video;
  an information acquiring module, configured to acquire at least two pieces of target information associated with the video;
  an information displaying module, configured to display first target information of the at least two pieces of target information in an information displaying region of a playback page of the video, where a size of the information displaying region is smaller than a size of the playback page;
  a switching module, configured to receive a first switch triggering operation of the user, and switch the first target information displayed in the information displaying region to second target information of the at least two pieces of target information.

An embodiment of the present disclosure also provides an electronic device, including: a processor; and a memory, configured to store executable instructions for the processor; where the processor is configured to read the executable instructions from the memory, and execute the instructions to implement the video-based information displaying method provided by the embodiments of the present disclosure.

An embodiment of the present disclosure also provides a computer-readable storage medium, where the storage medium has a computer program stored thereon, and the computer program is used to implement the video-based information displaying method provided by the embodiments of the present disclosure.

An embodiment of the present disclosure also provides a computer program, and the computer program is stored in a readable storage medium. At least one processor of an electronic device can read the above computer program from the readable storage medium, and the at least one processor executes the computer program to cause the electronic device to execute the video-based information display method provided by the embodiments of the present disclosure.

An embodiment of the present disclosure also provides a computer program product including a computer program. When the computer program is executed by a processor, the video-based information displaying method provided by the embodiments of the present disclosure is implemented.

BRIEF DESCRIPTION OF DRAWINGS

The above and other features, advantages and aspects of various embodiments of the present disclosure will become more apparent when taken in conjunction with the accompanying drawings and with reference to the following description of embodiments. Throughout the drawings, same or similar reference signs refer to the same or similar elements. It should be understood that the drawings are schematic and that originals and elements are not necessarily drawn to scale.

DESCRIPTION OF EMBODIMENTS

Embodiments of the present disclosure will be described in more detail below with reference to the accompanying drawings. Although certain embodiments of the present disclosure are illustrated in the accompanying drawings, it should be understood that the present disclosure may be implemented in various forms and should not be construed as limited to the embodiments set forth herein. By contrary, the embodiments are provided for the purpose of a more thorough and complete understanding of the present disclosure. It should be understood that the accompanying drawings and embodiments of the present disclosure are only for exemplary purposes, and are not intended to limit the protection scope of the present disclosure.

It should be understood that the various steps described in the method embodiments of the present disclosure may be performed in different orders, and/or performed in parallel. Furthermore, method embodiments may include additional steps and/or omit performing the illustrated steps. The scope of the present disclosure is not limited in this regard.

As used herein, the term "including" and variations thereof refer to open inclusions, i.e., "including but not limited to". The term "based on" refers to "based at least in part on". The term "an embodiment" represents "at least one embodiment"; the term "another embodiment" represents "at least one another embodiment"; the term "some embodiments" represents "at least some embodiments". Relevant definitions of other terms will be given in the description below.

It should be noted that concepts such as "first", "second" and the like mentioned in the present disclosure are only used to distinguish between different apparatuses, modules or units, and are not intended to define the order or interdependence of the functions performed by these apparatuses, modules or units.

It should be noted that the modifications of "one" and "multiple" mentioned in the present disclosure are schematic and not limiting, and it should be understood by those skilled in the art that they should be understood as "one or more", unless otherwise explicitly indicated in the context.

Names of messages or information interacted between multiple apparatuses in the embodiments of the present disclosure are used for illustrative purposes only, and are not used to limit the scope of these messages or information.

Figure 1:
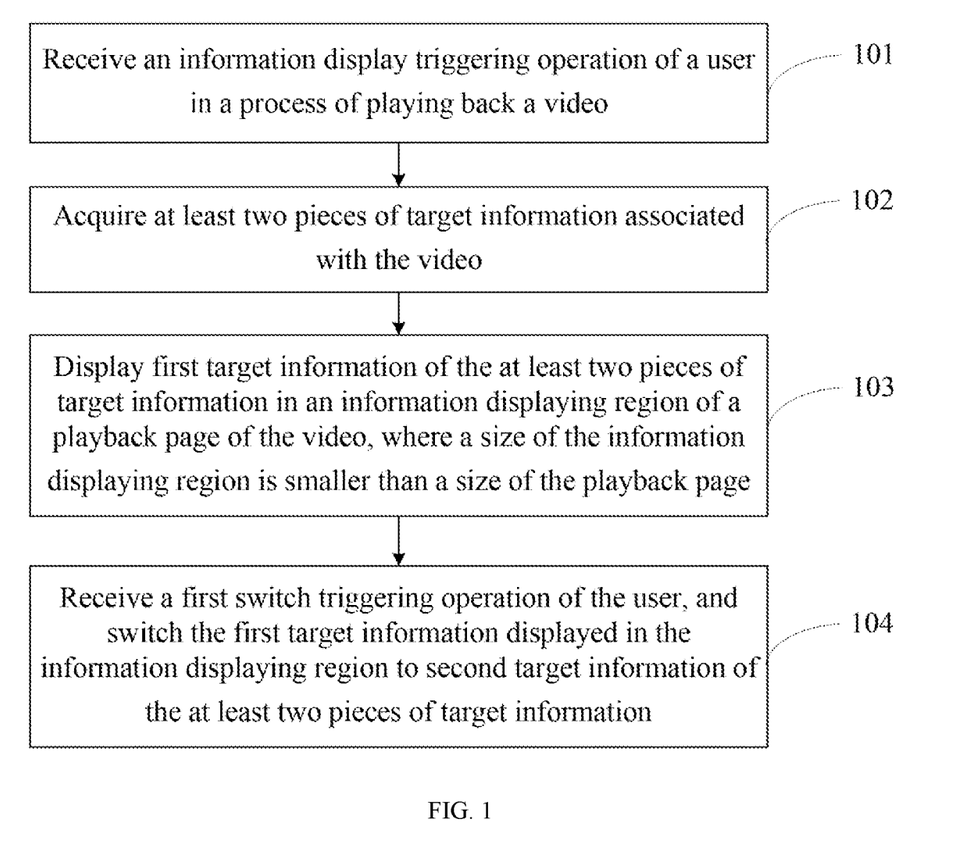
FIG. 1 is a schematic flowchart of a video-based information displaying method provided by an embodiment of the present disclosure.

FIG. 1 is a schematic flowchart of a video-based information displaying method provided by an embodiment of the present disclosure. The method can be executed by a video-based information displaying apparatus, where the apparatus can be implemented by software and/or hardware, and generally can be integrated in an electronic device. As shown in FIG. 1, the method includes the following steps.

Step 101, receive an information display triggering operation of a user in a process of playing back a video.

The video may be any video related to an item or product. The embodiment of the present disclosure does not limit a source of the video. For example, the video may be a product recommendation video shot by an expert in a certain field, or may be a product introduction video shot by an owner of the product. The information display triggering operation refers to an operation for displaying other information related to the video, and in the embodiment of the present disclosure, refers to an operation for displaying product information related to the video.

In the embodiment of the present disclosure, the receiving the information display triggering operation of the user includes: receiving the information display triggering operation based on a triggering operation of the user on a preset information displaying control on the playback page. The playback page refers to a page for playing back the above video, and the information displaying control refers to an anchor point set on the above playback page for displaying information. A form of the information displaying control is not limited. For example, the information displaying control may be an icon or text information of a shopping cart.

Specifically, in the process of playing back the video on the playback page, the triggering operation of the user on the playback page may be detected, and when a clicking or hovering operation of the user on the information displaying control is detected, the information display triggering operation may be received.

Step 102, acquire at least two pieces of target information associated with the video.

The target information refers to related information used to introduce an object, and the object may be the above-mentioned item or product related to the video, that is, the target information may be related information of the product. In the embodiment of the present disclosure, the target information may include at least one of an object image, an object name, object characteristic information (such as, an object value), object review information and object exchange information, where the number of object images is at least one. When the target information is product information, the target information may include a product image, a product name, product characteristic information (such as, a product value), product review information, product exchange information, etc., and the number of product images may be one or more.

In the embodiment of the present disclosure, after the information display triggering operation of the user is received, pre-stored target information associated with the video may be acquired from a server, and the number of pieces of target information may be multiple.

Step 103: display first target information of the at least two pieces of target information in an information displaying region of a playback page of the video, where a size of the information displaying region is smaller than a size of the playback page.

The information displaying region may be a region set on the playback page. The region may be displayed in a form of a pop-up layer, and may be covered on the playback page. The size of the information displaying region is set to be smaller than the size of the entire playback page, and the specific size can be set according to the actual situation. For example, the specific size may be set to half the size of the playback page. Moreover, a position of the information displaying region is not limited. For example, the information displaying region may be set at a lower part of the playback page.

Specifically, after the target information associated with the video is acquired, the information displaying region may be displayed on the playback page, and the first target information in the target information may be displayed in the information displaying region. Since the size of the information displaying region is smaller than that of the playback page, the user can view detailed information about the product associated with the video while watching the video. Since the number of the pieces of the target information may be multiple, the first target information refers to any piece of the target information, that is, one piece of the target information may be determined as a piece of information displayed initially by default.

Step 104, receive a first switch triggering operation of the user, and switch the first target information displayed in the information displaying region to second target information of the at least two pieces of target information.

The first switch triggering operation refers to a specific operation for switching the first target information displayed currently. A form of the specific operation is not limited. For example, the first switch triggering operation may be a vertical swiping operation of the user on the first target information. The second target information refers to any piece of information except the first target information among the multiple pieces of target information.

Specifically, when the user wants to switch the first target information displayed currently, the user can trigger the first target information. A terminal can receive the first switch triggering operation of the user, and then switch the first target information displayed in the information displaying region to the second target information of the at least two pieces of target information, to enable the user to switch between different target information, and then view different target information, which optimizes the displaying effect of multiple pieces of information.

In the video-based information displaying solution provided by the embodiment of the present disclosure, the information display triggering operation of the user is received in the process of playing back the video; at least two pieces of target information associated with the video are acquired; the first target information of the at least two pieces of target information is displayed on the information displaying region of the playback page of the video, where the size of the information displaying region is smaller than the size of the playback page; the first switch triggering operation of the user is received, and the first target information displayed in the information displaying region is switched to the second target information of the at least two pieces of target information. With the above technical solution, multiple pieces of associated information can be displayed on the set region of the playback page of the video based on the triggering of the user in the process of playing back the video. Since the size of the set region cannot occupy the whole playback page, the associated information can be displayed without affecting the playback of the video, thereby improving the effect of information displaying. Based on the triggering of the user, switching can be performed between multiple pieces of video-related information, which meets the user's demands for viewing sets of video-related information, and further improves the effect of information displaying in a video scene.

In some embodiments, the video-based information displaying method may further include: displaying thumbnail information in the information displaying region, where the thumbnail information includes thumbnail images of the at least two pieces of target information; the receiving the first switch triggering operation of the user includes: receiving the first switch triggering operation of the user based on a triggering operation on a thumbnail image of the second target information in the thumbnail information.

In some embodiments, the displaying the first target information of the at least two pieces of target information in the information displaying region of the playback page of the video includes: in response to a triggering operation of the user on a thumbnail image of the first target information in the thumbnail information, performing displaying of the first target information of the at least two pieces of target information in the information displaying region of the playback page of the video.

The thumbnail information may be information in the displayed information that is much smaller than the target information displayed in the information displaying region, and the thumbnail information is used to represent complete target information. The thumbnail information in the embodiment of the present disclosure may include a thumbnail image of each target information. Specifically, while the target information is displayed in the information displaying region, the thumbnail information may be displayed in a set region of the information displaying region. A size of the set region is smaller than the size of the information displaying region. The specific size and position are not limited, and may be set according to the actual situation. In the process of playing back the video, after receiving the information display triggering operation of the user, the above thumbnail information may be displayed first, and when a clicking operation or hovering operation of the user on the thumbnail image of the first target information in the thumbnail information is detected, the above step of displaying the first target information in the information displaying region of the playback page of the video may be performed. On the basis of displaying the above thumbnail information, when a clicking operation or hovering operation of the user on the thumbnail image corresponding to the second target information in the thumbnail information is detected, it may be determined that the first switch triggering operation is received.

It can be understood that when the thumbnail information is displayed in the set region of the above information displaying region, since there are multiple pieces of target information, thumbnail images of a preset number of pieces of target information can be set to display. The preset number is less than the total amount of target information. The switching of thumbnail images can be realized by setting more buttons or performing a swiping operation in the set region. For example, assuming that the number of pieces of target information is 10, only thumbnail images of 3 pieces of target information may be displayed, and switching to the thumbnail images of other target information can be realized by triggering more buttons or performing the swiping operation in the set region by the user.

In the above method, while displaying multiple pieces of associated information of the video in the information displaying region, the thumbnail information corresponding to the multiple pieces of associated information can also be displayed, and by supporting the switching operation of the user on the thumbnail information, the displaying of the associated information and the switching of the displayed associated information can be realized, which makes the way of information displaying and the way of information switching more flexible, thereby further improving the effect of information displaying and thus improving user experience.

In some embodiments, the video-based information displaying method may further include: determining sizes and positions of an image displaying region and a text displaying region of the information displaying region, where a size of the image displaying region is larger than a size of the text displaying region. The image displaying region may be a region set in the information displaying region for displaying related image information, and the text displaying region may be a region set in the information displaying region for displaying text information other than images. The sizes and positions of the image displaying region and the text displaying region can be set according to the actual situation. The size of the image displaying region may be larger than that of the text displaying region, so that the user can intuitively understand the image information.

In an embodiment of the present disclosure, the displaying the first target information of the at least two pieces of target information in the information displaying region of the playback page of the video includes: displaying, in the image displaying region, an object image in the first target information, and displaying, in the text displaying region, other information except the object image. Specifically, after determining the sizes and positions of the image displaying region and the text displaying region of the information displaying region, the object image in the first target information may be displayed in the image displaying region, and other text information may be displayed in the text displaying region. Displaying positions of different text information are not limited.

In an implementation, the video-based information displaying method may further include: when the number of object images in the image displaying region is at least two, receiving a second switch triggering operation of the user in the image displaying region; switching a first image displayed in the image displaying region to a second image. The second switch triggering operation refers to a specific operation for switching the image displayed in the image displaying region, and a form of the operation is not limited. For example, the second switch triggering operation may be a horizontal swiping operation of the user on the object image displayed currently. The first image refers to an object image in the first object information displayed currently, and the second image refers to any image except the first image among the multiple object images included in the first target information.

Specifically, when the number of object images in the first target information may be two or more, and when the user wants to switch the first image displayed currently, horizontal swiping triggering may be performed on the first image in the image displaying region. The terminal may receive the second switch triggering operation, and then the first image displayed in the image displaying region is switched to the second image, to allow the user to view multiple object images included in the target information more efficiently.

In the above method, when there are multiple images included in the associated information in the information displaying region, by performing the triggering operation on the image displayed currently, the displayed image can be switched independently, which makes the displaying of images in the associated information more flexible and efficient, and further improves the effect of information displaying.

In some embodiments, the video-based information displaying method may further include: displaying a live switching control on the playback page; in response to detecting that the user triggers the live switching control, displaying a live page associated with current target information, where the current target information is target information which is currently displayed on the playback page among the at least two pieces of target information.

The live switching control refers to an anchor point set on the above playback page for displaying the live page, and a form of the live switching control is not limited. The above live page associated with the current target information may be a preset recommendation page, or may be a live page for recommending the current target information at the moment, or may be a playback page of an author of the video, which is not specifically limited. Specifically, the live switching control may be displayed on the playback page of the video, and when a clicking operation of the user on the live switching control is detected, the live page associated with the current target information may be displayed. The specific displaying manner of the live page is not limited. For example, the live page may be overlaid on the playback page for display, and an overlaid region may be the entire playback page or a set ratio of the playback page; or the displaying of the live page may be switched to after the playback page is closed.

In the above method, on the basis of displaying associated information without affecting the playback of the video, it is also supported that the live page related to the displayed associated information can be switched to, which enables the user to switch from a video scene to a live scene flexibly, thereby further improving the user experience.

Figure 2:
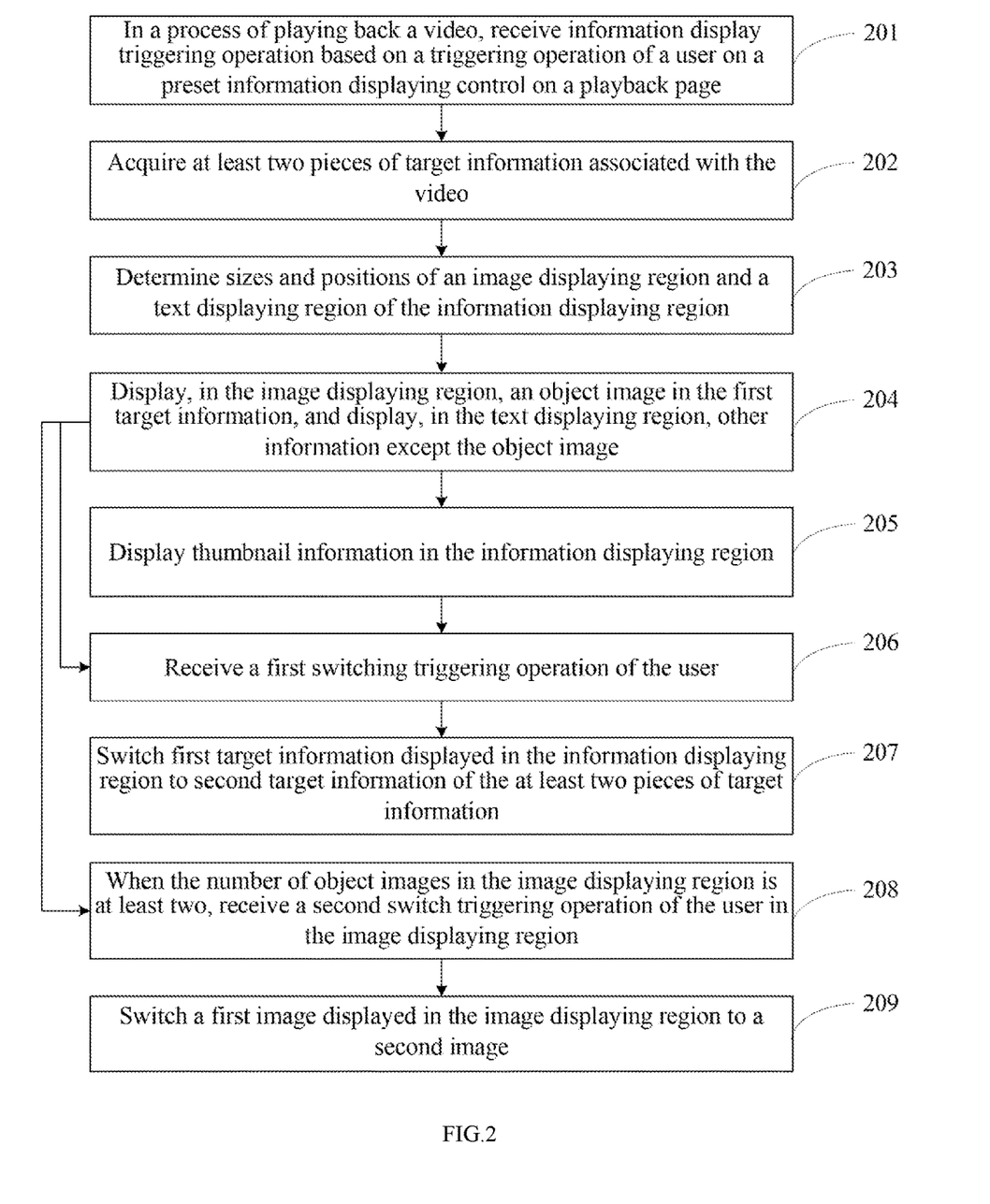
FIG. 2 is a schematic flowchart of another video-based information displaying method provided by an embodiment of the present disclosure.

FIG. 2 is a schematic flowchart of another video-based information displaying method provided by an embodiment of the present disclosure. This embodiment further optimizes the above video-based information displaying method on the basis of the foregoing embodiments. As shown in FIG. 2, the method includes the following steps.

Step 201, in a process of playing back a video, receive information display triggering operation based on a triggering operation of a user on a preset information displaying control on a playback page.

Figure 3:
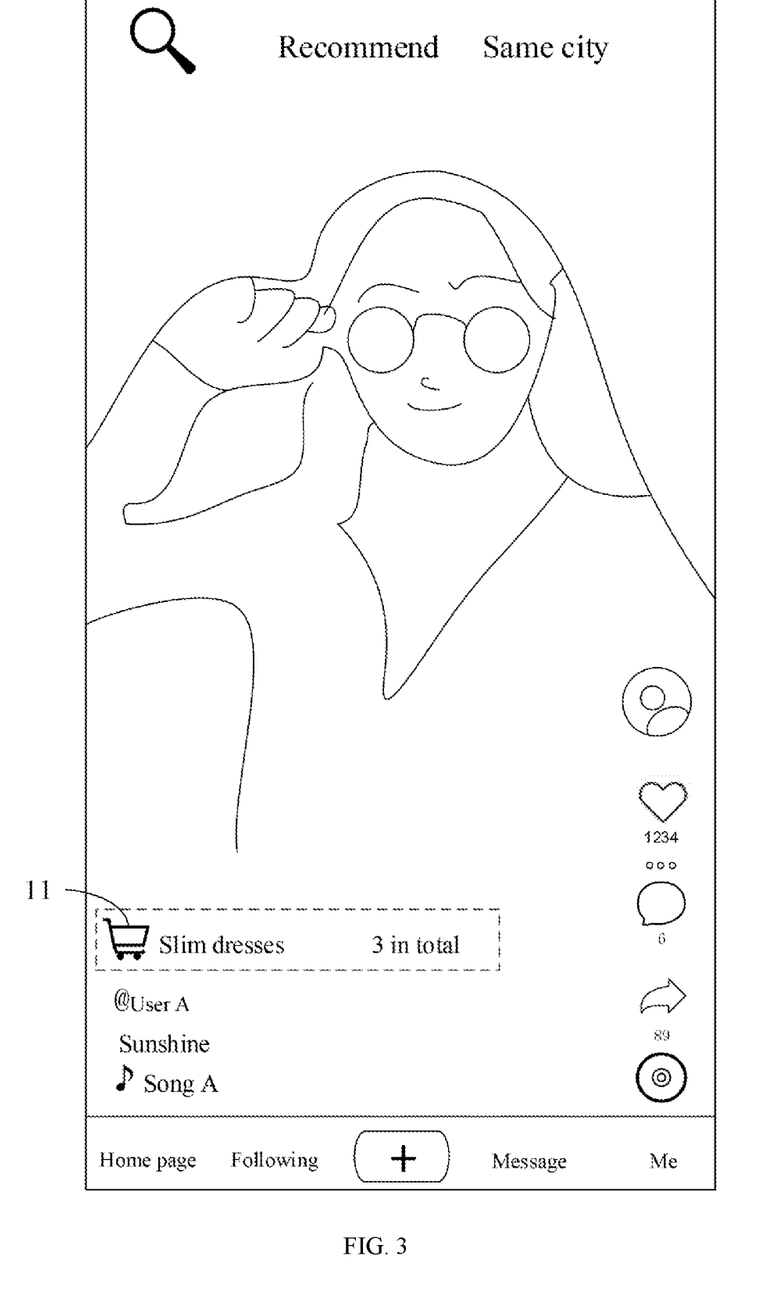
FIG. 3 is a schematic diagram of information displaying provided by an embodiment of the present disclosure.

Illustratively, FIG. 3 is a schematic diagram of information displaying provided by an embodiment of the present disclosure. The figure shows a schematic diagram of a playback page, which includes a video being played back and a preset information displaying control 11. The information displaying control 11 is set in the form of a shopping cart. When the user triggers the information displaying control 11, a terminal can receive the information display triggering operation, so as to display product information associated with the video subsequently.

The playback page in FIG. 3 also displays other video-related information, for example, the figure includes a song in the video, a head portrait, a name and a profile of an author of the video, etc. The song in the video is "song A", the name of the author of the video is "User A", and the profile is "Sunshine". In addition, functional controls for supporting the user to interact with the video are also displayed on the right side of the playback page in FIG. 3, including a like control, a comment control, and a sharing control in the figure. The numbers of interactions of the controls are also displayed below these controls respectively, for example, the number of likes is 1234, the number of comments is 6, and the number of sharing is 89 in the figure.

Step 202, acquire at least two pieces of target information associated with the video.

The target information includes at least one of an object image, an object name, object characteristic information (such as, an object value), object review information and object exchange information, where the number of object images is at least one.

Step 203, step 204 and/or step 205 may be performed after step 202. The order of execution of step 203-step 205 may be determined according to the actual situation, and FIG. 2 is only an example.

Step 203, determine sizes and positions of an image displaying region and a text displaying region of the information displaying region.

A size of the information displaying region is smaller than a size of the playback page, and a size of the image displaying region is larger than a size of the text displaying region.

It can be understood that step 203 may also be performed before step 201. Step 204 and/or step 205 may be performed after step 203.

Step 204, display, in the image displaying region, an object image in the first target information, and display, in the text displaying region, other information except the object image.

Step 205, step 206-step 207 and/or step 208-step 209 may be performed after step 204, and the specific order of execution shown in FIG. 2 is only an example.

Figure 4:
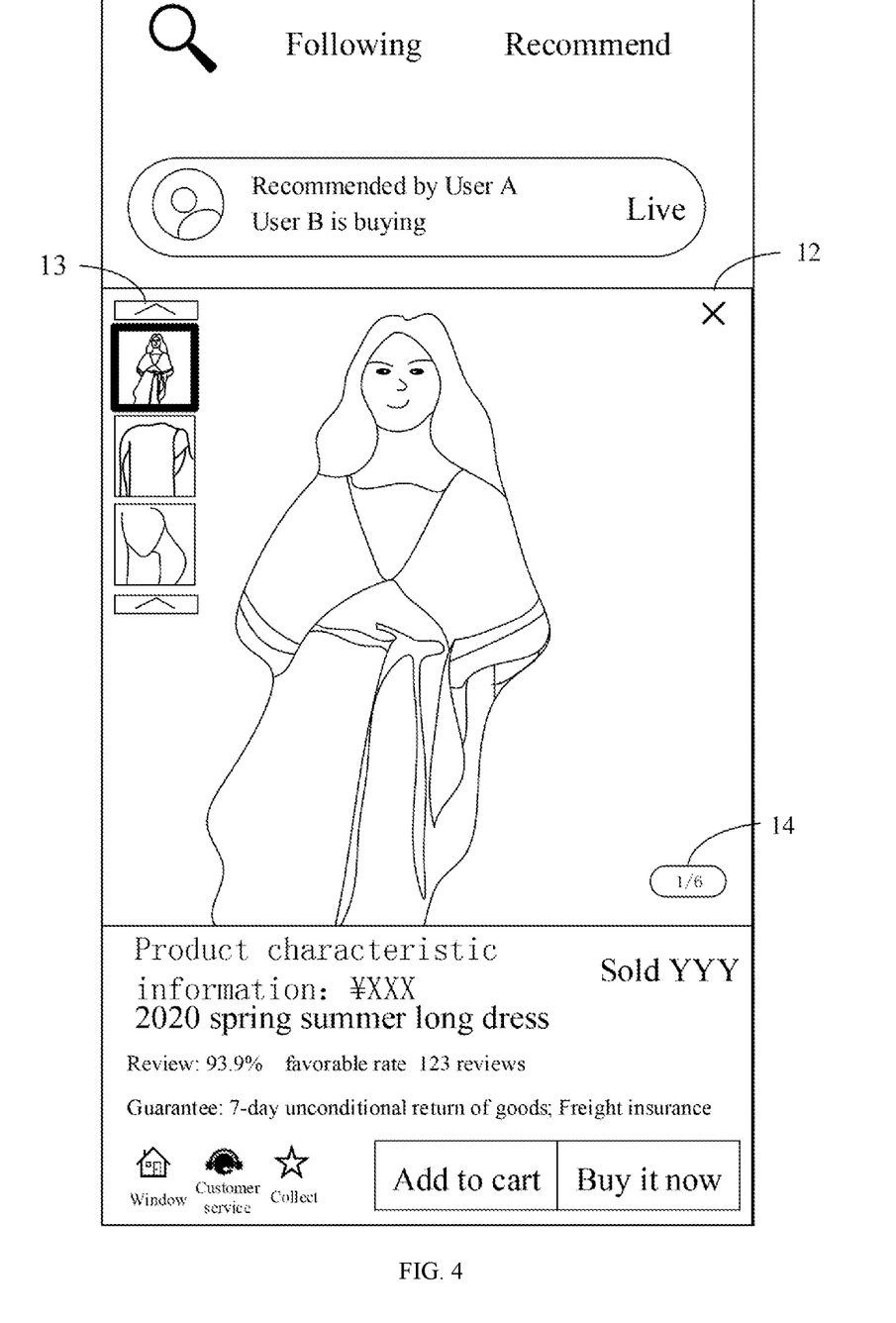
FIG. 4 is a schematic diagram of another information displaying provided by an embodiment of the present disclosure.

Illustratively, FIG. 4 is a schematic diagram of another information displaying provided by an embodiment of the present disclosure. FIG. 4 shows an information displaying region 12 after the information displaying control 11 in FIG. 3 is triggered. As shown in FIG. 4, the size of the information displaying region 12 is smaller than that of the playback page, the information displaying region 12 is displayed in a half of the screen, and the size of the image displaying region displayed above in the information displaying region 12 is also larger than that of the text displaying region below. As shown in FIG. 4, the first target information displayed in the figure is product detail information, and a product image is displayed in the information displaying region 12. The product name is "2020 spring and summer long dress", the product characteristic information is "YXXX", the product review information is "93.9% favorable rate 123 reviews", and the product exchange information is "sold YYY". Other guarantee information and functional buttons are also included, including buying, window, customer service, collecting and other functional buttons, to enable the user to perform certain functions on the basis of product information displaying.

Step 205, display thumbnail information in the information displaying region.

The thumbnail information includes thumbnail images of the at least two pieces of target information.

Illustratively, referring to FIG. 4, thumbnail information 13 is displayed in the information displaying region 12 on the playback page of FIG. 4. In the thumbnail information 13, only thumbnail images of 3 pieces of target information are displayed, and as shown in FIG. 4, the first thumbnail image displayed in a bold frame is the thumbnail image corresponding to the target information displayed currently. The switching to the thumbnail images of other target information may be realized by triggering more buttons or performing a swiping operation in a set region by the user. The size and position of the thumbnail information 13 shown in FIG. 4 are only examples.

The order of execution of step 205 shown in FIG. 2 is only an example. Step 205 may also be performed after step 201, and step 204 may also be performed in response to a triggering operation of the user on the thumbnail image of the first target information in the thumbnail information. Step 206 may be performed after step 205.

Step 206, receive a first switch triggering operation of the user.

In an implementation, the receiving the first switch triggering operation of the user includes: receiving the first switch triggering operation of the user based on a triggering operation of the user on a thumbnail image of the second target information in the thumbnail information.

Step 207, switch the first target information displayed in the information displaying region to second target information of the at least two pieces of target information.

Figure 5:
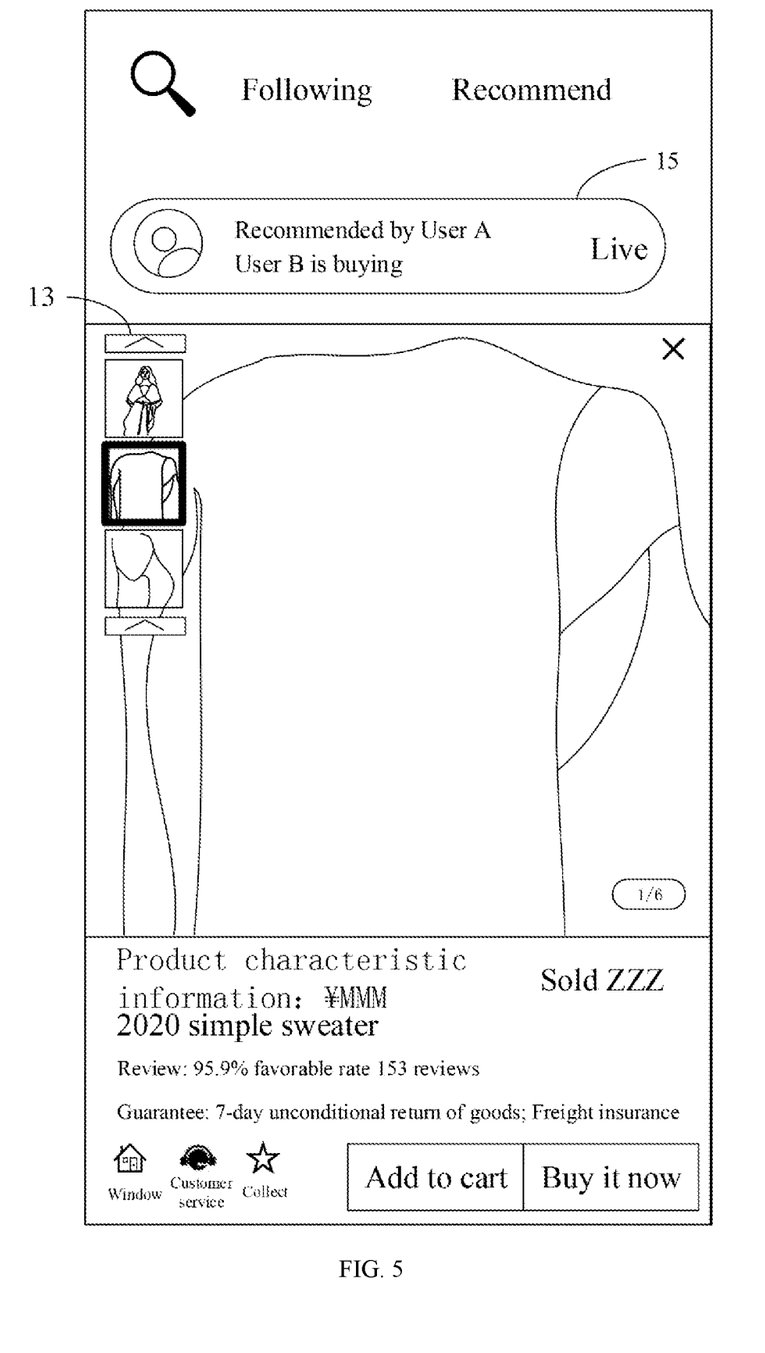
FIG. 5 is a schematic diagram of yet another information displaying provided by an embodiment of the present disclosure.

Illustratively, FIG. 5 is a schematic diagram of yet another information displaying provided by an embodiment of the present disclosure. FIG. 4 and FIG. 5 respectively show schematic diagrams of the playback page before and after the first switch triggering operation. When the user performs vertical swiping triggering on the target image of the target information displayed currently in the information displaying region 12, or when the user performs clicking triggering on the second thumbnail image in the thumbnail information 13, it may be determined that the first switch triggering operation is received, and the displayed first target information is switched to the second target information corresponding to the second thumbnail image. As shown in FIG. 5, the second target information, that is, another product detail information, is switched to on the playback page, and the specific information is different from the first target information in FIG. 4. The frame of the second thumbnail image in the thumbnail information 13 is made bold, which indicates that the corresponding second target information thereof is being displayed.

Step 208, when the number of object images in the image displaying region is at least two, receive a second switch triggering operation of the user in the image displaying region.

Step 209, switch a first image displayed in the image displaying region to a second image.

Illustratively, referring to the above-described FIG. 4, a number displaying region 14 for the object image in the first target information is displayed at a lower right part of the image displaying region. It can be seen from the number displaying region 14 in FIG. 4 that the number of the object images is 6, and the first image is being displayed currently. When a horizontal swiping triggering operation of the user on the first image is received, the first image may be switched to the second image for display. At this time, the number displaying region 14 may be changed from "1/6" to "2/6", indicating that the second image is switched to for display. It can be understood that, when there are multiple object images, the displaying order may be determined according to the actual situation, and is not specifically limited.

In an implementation, the video-based information displaying method may further include: displaying a live switching control on the playback page; in response to detecting that the user triggers the live switching control, displaying a live page associated with current target information, where the current target information is target information which is currently displayed on the playback page among the at least two pieces of target information.

Illustratively, referring to the above-described FIG. 5, a live switching control 15 is displayed on the playback page, and "Recommended by User A" and "User B is buying" are displayed in the live switching control 15. When the user triggers the live switching control 15, a live page associated with the current target information may be displayed.

In the video-based information displaying solution provided by the embodiment of the present disclosure, the information display triggering operation of the user is received in the process of playing back the video; at least two pieces of target information associated with the video are acquired; the first target information of the at least two pieces of target information is displayed on the information displaying region of the playback page of the video, where the size of the information displaying region is smaller than the size of the playback page; the first switch triggering operation of the user is received, and the first target information displayed in the information displaying region is switched to the second target information of the at least two pieces of target information. With the above technical solution, multiple pieces of associated information can be displayed on the set region of the playback page of the video based on the triggering of the user in the process of playing back the video. Since the size of the set region cannot occupy the whole playback page, the associated information can be displayed without affecting the playback of the video, thereby improving the effect of information displaying. Based on the triggering of the user, switching can be performed between multiple pieces of video-related information, which meets the user's demands for viewing sets of video-related information, and further improves the effect of information displaying in a video scene. In addition, when the associated information in the information displaying region includes multiple images, by performing the triggering operation on the image displayed currently, the displayed image can be switched independently, which makes the displaying of images in the associated information more flexible and efficient, and further improves the effect of information displaying.

Figure 6:
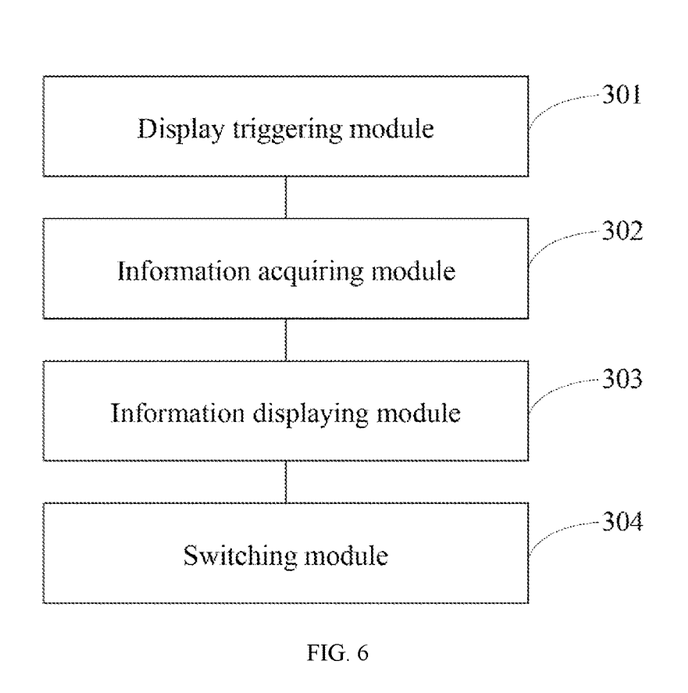
FIG. 6 is a schematic structural diagram of a video-based information displaying apparatus provided by an embodiment of the present disclosure.

FIG. 6 is a schematic structural diagram of a video-based information displaying apparatus provided by an embodiment of the present disclosure. The apparatus may be implemented by software and/or hardware, and may generally be integrated into an electronic device. As shown in FIG. 6, the apparatus includes:

a display triggering module 301, configured to receive an information display triggering operation of a user in a process of playing back a video;

an information acquiring module 302, configured to acquire at least two pieces of target information associated with the video;

an information displaying module 303, configured to display first target information of the at least two pieces of target information in an information displaying region of a playback page of the video, where a size of the information displaying region is smaller than a size of the playback page;

a switching module 304, configured to receive a first switch triggering operation of the user, and switch the first target information displayed in the information displaying region to second target information of the at least two pieces of target information.

In an implementation, the display triggering module 301 is specifically configured to:

receive the information display triggering operation based on a triggering operation of the user on a preset information displaying control on the playback page.

In an implementation, the apparatus further includes a region determining module, configured to:

determine sizes and positions of an image displaying region and a text displaying region of the information displaying region, where a size of the image displaying region is larger than a size of the text displaying region.

In an implementation, the information displaying module 303 is specifically configured to:

display, in the image displaying region, an object image in the first target information, and display, in the text displaying region, other information except the object image.

In an implementation, the apparatus further includes an image switching module, configured to:

when the number of object images in the image displaying region is at least two, receive a second switch triggering operation of the user in the image displaying region; switch a first image displayed in the image displaying region to a second image.

In an implementation, the apparatus further includes a thumbnail module, configured to:

display thumbnail information in the information displaying region, where the thumbnail information includes thumbnail images of the at least two pieces of target information;

the switching module 304 is specifically configured to:

receive the first switch triggering operation of the user based on a triggering operation on a thumbnail image of the second target information in the thumbnail information.

In an implementation, the information displaying module 303 is specifically configured to:

in response to a triggering operation of the user on a thumbnail image of the first target information in the thumbnail information, perform displaying of the first target information of the at least two pieces of target information in the information displaying region of the playback page of the video.

In an implementation, the apparatus further includes a live module, configured to:

display a live switching control on the playback page;

in response to detecting that the user triggers the live switching control, display a live page associated with current target information, where the current target information is target information which is currently displayed on the playback page among the at least two pieces of target information.

In an implementation, the target information includes at least one of an object image, an object name, object characteristic information (such as, an object value), object review information and object exchange information, where the number of object images is at least one.

The video-based information displaying apparatus provided in the embodiments of the present disclosure can execute the video-based information displaying method provided in any embodiment of the present disclosure, and has functional modules and beneficial effects corresponding to the executed method.

An embodiment of the present disclosure further provides a computer program product including a computer program/instruction. When the computer program/instruction is executed by a processor, the video-based information displaying method provided by any embodiment of the present disclosure is implemented.

Figure 7:
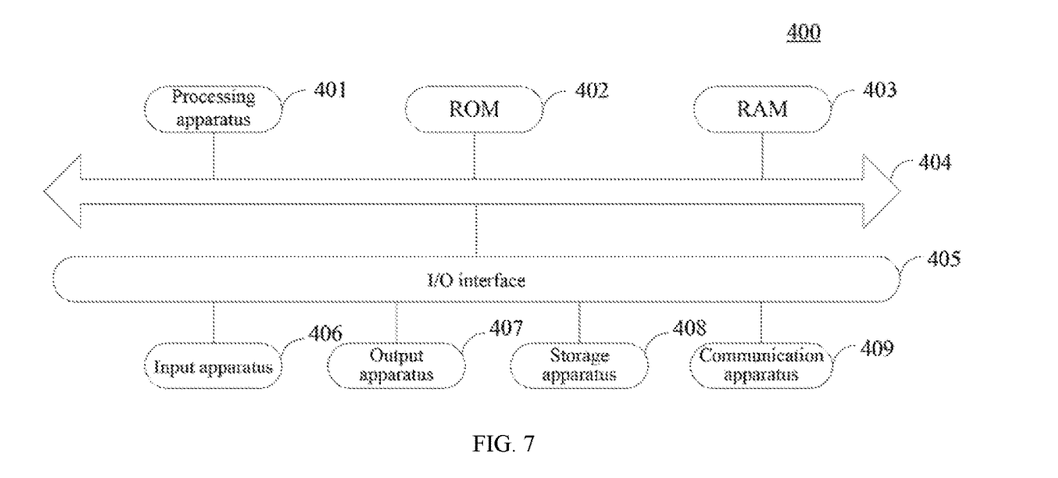
FIG. 7 is a schematic structural diagram of an electronic device provided by an embodiment of the present disclosure.

FIG. 7 is a schematic structural diagram of an electronic device provided by an embodiment of the present disclosure. Referring to FIG. 7 in detail below, FIG. 7 shows a schematic structural diagram of an electronic device 400 suitable for implementing embodiments of the present disclosure. The electronic device 400 in the embodiment of the present disclosure may include, but is not limited to, a mobile terminal such as a mobile phone, a notebook computer, a digital broadcast receiver, a personal digital assistant (PDA), a portable android device (PAD), a portable media player (PMP), an on-vehicle terminal (for example, a vehicle navigation terminal), etc., and a fixed terminal such as a digital TV, a desktop computer, etc. The electronic device shown in FIG. 7 is only an example, and should not bring any limitation to the functions and scope of use for the embodiments of the present disclosure.

As shown in FIG. 7, the electronic device 400 may include a processing apparatus (such as a central processing unit, a graphics processor, etc.) 401, which may execute suitable actions and processing according to programs stored in a read only memory (ROM) 402 or programs loaded into a random access memory (RAM) 403 from a storage apparatus 408. In the RAM 403, various programs and data required for the operation of the electronic device 400 are also stored. The processing apparatus 401, the ROM 402 and the RAM 403 are connected to each other through a bus 404. An input/output (I/O) interface 405 is also connected to the bus 404.

Generally, the following apparatuses can be connected to the I/O interface 405: an input apparatus 406, including for example a touch screen, a touch panel, a keyboard, a mouse, a camera, a microphone, an accelerometer, a gyroscope, etc.; an output apparatus 407, including for example a liquid crystal display (LCD), a speaker, a vibrator, etc.; the storage apparatus 408, including for example a magnetic tape, a hard disk, etc.; and a communication apparatus 409. The communication apparatus 409 can allow the electronic device 400 to perform wireless or wired communication with other devices to exchange data. It should be understood that although FIG. 7 shows the electronic device 400 with multiple kinds of apparatuses, it is not required to implement or have all the apparatuses shown in FIG. 3. Alternatively, more or fewer apparatuses may be implemented or provided.

Compared with the prior art, the technical solutions provided by the embodiments of the present disclosure have the following advantages that: in the video-based information displaying solution provided by the embodiments of the present disclosure, an information display triggering operation of a user is received in a process of playing back a video; at least two pieces of target information associated with the video are acquired; first target information of the at least two pieces of target information is displayed in an information displaying region of a playback page of the video, where a size of the information displaying region is smaller than a size of the playback page; a first switch triggering operation of the user is received, and the first target information displayed in the information displaying region is switched to second target information of the at least two pieces of target information. With the above technical solution, multiple pieces of associated information can be displayed on a set region of the playback page of the video based on the triggering of the user in the process of playing back the video. Since the size of the set region cannot occupy the whole playback page, the associated information can be displayed without affecting the playback of the video, thereby improving the effect of information displaying. Based on the triggering of the user, switching can be performed between multiple pieces of video-related information, which meets the user's demands for viewing sets of video-related information, and further improves the effect of information displaying in a video scene.

In particular, according to an embodiment of the present disclosure, the process described above with reference to the flowchart may be implemented as a computer software program. For example, an embodiment of the present disclosure includes a computer program product, which includes a computer program carried on a non-transitory computer-readable medium, and the computer program contains program codes for executing the method shown in the flowchart. In such an embodiment, the computer program may be downloaded and installed from the network through the communication apparatus 409, or installed from the storage apparatus 408, or installed from the ROM 402.

When the computer program is executed by the processing apparatus 401, the above-described functions defined in the video-based information displaying method of the embodiments of the present disclosure are executed.

It should be noted that the above-mentioned computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared or semiconductor system, apparatus or device, or any combination thereof. More specific examples of the computer-readable storage medium may include, but are not limited to: an electrical connection with one or more wires, a portable computer disk, a hard disk, a random access memory (RAM), a read only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, a computer-readable storage medium may be any tangible medium that includes or stores programs, and the programs may be used by or in combination with an instruction execution system, apparatus or device. In the present disclosure, a computer-readable signal medium may include a data signal propagated in a baseband or as a part of a carrier wave, and a computer-readable program code is carried therein. This propagated data signal may take many forms, including but not limited to an electromagnetic signal, an optical signal, or any suitable combination thereof. The computer-readable signal medium may also be any computer-readable medium other than the computer-readable storage medium, and the computer-readable signal medium may send, propagate or transmit the program used by or in combination with the instruction execution system, apparatus or device. The program code contained on the computer-readable medium may be transmitted by any suitable medium, including but not limited to: a wire, an optical cable, a radio frequency (Radio Frequency, RF), etc., or any suitable combination of the above.

In some embodiments, a client and a server can use any currently known or future developed network protocol, such as HTTP (HyperText Transfer Protocol), to communicate, and can be interconnected with digital data communication (e.g., a communication network) in any form or medium. Examples of the communication network include a local area network (LAN), a wide area network (WAN), the Internet work (e.g., the Internet), and a peer-to-peer network (e.g., an ad hoc peer-to-peer network), and any currently known or future developed network.

The above-mentioned computer-readable medium may be included in the above-mentioned electronic device, or may exist alone without being assembled into the electronic device.

The above-mentioned computer-readable medium carries one or more programs, and when the above one or more programs are executed by the electronic device, the electronic device is caused to: receive an information display triggering operation of a user in a process of playing back a video; acquire at least two pieces of target information associated with the video; display first target information of the at least two pieces of target information in an information displaying region of a playback page of the video, where a size of the information displaying region is smaller than a size of the playback page; receive a first switch triggering operation of the user, and switch the first target information displayed in the information displaying region to second target information of the at least two pieces of target information.

The computer program code used to perform operations of the present disclosure may be written in one or more programming languages or a combination thereof. The above-mentioned programming languages include, but not limited to, an object-oriented programming language—such as Java, Smalltalk, C++, and also include a conventional procedural programming language—such as "C" language or similar programming language. The program code may be executed entirely on a user computer, partly on a user computer, executed as an independent software package, partly executed on a user computer and partly executed on a remote computer, or entirely executed on a remote computer or server. In a case where a remote computer is involved, the remote computer may be connected to the user computer through any kind of network—including a local area network (LAN) or a wide area network (WAN), or, may be connected to an external computer (for example, connected via the Internet through an Internet service provider).

The flowcharts and block diagrams in the accompanying drawings illustrate possible implementations of architectures, functions and operations of the systems, methods and computer program products according to the embodiments of the present disclosure. In this point, each block in the flowcharts or block diagrams may represent a module, a program segment, or a part of code, and the module, the program segment, or the part of code contains one or more executable instructions for implementing a specified logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that each block in the block diagram and/or flowchart, and the combination of the blocks in the block diagram and/or flowchart, may be implemented by a dedicated hardware-based system that performs the specified functions or operations, or may be implemented by a combination of dedicated hardware and computer instructions.

The units involved in the embodiments described in the present disclosure may be implemented in software or hardware. A name of a unit does not constitute a limitation on the unit itself in some cases.

The functions described herein above may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system-on-a-chip (SOC), a complex programmable logic device (CPLD), etc.

In the context of the present disclosure, a machine-readable medium may be a tangible medium, which may include or store a program for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides a video-based information displaying method, including:
- receiving an information display triggering operation of a user in a process of playing back a video;
- acquiring at least two pieces of target information associated with the video;
- displaying first target information of the at least two pieces of target information in an information displaying region of a playback page of the video, where a size of the information displaying region is smaller than a size of the playback page;
- receiving a first switch triggering operation of the user, and switching the first target information displayed in the information displaying region to second target information of the at least two pieces of target information.

According to one or more embodiments of the present disclosure, in the video-based information displaying method provided by the present disclosure, the receiving the information display triggering operation of the user includes:
- receiving the information display triggering operation based on a triggering operation of the user on a preset information displaying control on the playback page.

According to one or more embodiments of the present disclosure, the video-based information displaying method provided by the present disclosure further includes:
- determining sizes and positions of an image displaying region and a text displaying region of the information displaying region, where a size of the image displaying region is larger than a size of the text displaying region.

According to one or more embodiments of the present disclosure, in the video-based information displaying method provided by the present disclosure, the displaying the first target information of the at least two pieces of target information in the information displaying region of the playback page of the video includes:
- displaying, in the image displaying region, an object image in the first target information, and displaying, in the text displaying region, other information except the object image.

According to one or more embodiments of the present disclosure, the video-based information displaying method provided by the present disclosure further includes:
- when the number of object images in the image displaying region is at least two, receiving a second switch triggering operation of the user in the image displaying region;
- switching a first image displayed on the image displaying region to a second image.

According to one or more embodiments of the present disclosure, the video-based information displaying method provided by the present disclosure further includes:
- displaying thumbnail information in the information displaying region, where the thumbnail information includes thumbnail images of the at least two pieces of target information;
- the receiving the first switch triggering operation of the user includes:

receiving the first switch triggering operation of the user based on a triggering operation on a thumbnail image of the second target information in the thumbnail information.

According to one or more embodiments of the present disclosure, in the video-based information displaying method provided by the present disclosure, the displaying the first target information of the at least two pieces of target information in the information displaying region of the playback page of the video includes:

in response to a triggering operation of the user on a thumbnail image of the first target information in the thumbnail information, performing displaying of the first target information of the at least two pieces of target information in the information displaying region of the playback page of the video.

According to one or more embodiments of the present disclosure, the video-based information displaying method provided by the present disclosure further includes:

displaying a live switching control on the playback page;
in response to detecting that the user triggers the live switching control, displaying a live page associated with current target information, where the current target information is target information which is currently displayed on the playback page among the at least two pieces of target information.

According to one or more embodiments of the present disclosure, in the video-based information displaying method provided by the present disclosure, the target information includes at least one of an object image, an object name, object characteristic information, object review information and object exchange information, where the number of object images is at least one.

According to one or more embodiments of the present disclosure, the present disclosure provides a video-based information displaying apparatus, including:

a display triggering module, configured to receive an information display triggering operation of a user in a process of playing back a video;
an information acquiring module, configured to acquire at least two pieces of target information associated with the video;
an information displaying module, configured to display first target information of the at least two pieces of target information in an information displaying region of a playback page of the video, where a size of the information displaying region is smaller than a size of the playback page;
a switching module, configured to receive a first switch triggering operation of the user, and switch the first target information displayed in the information displaying region to second target information of the at least two pieces of target information.

According to one or more embodiments of the present disclosure, in the video-based information displaying apparatus provided by the present disclosure, the display triggering module is specifically configured to:

receive the information display triggering operation based on a triggering operation of the user on a preset information displaying control on the playback page.

According to one or more embodiments of the present disclosure, the video-based information displaying apparatus provided by the present disclosure further includes a region determining module, configured to:

determine sizes and positions of an image displaying region and a text displaying region of the information displaying region, where a size of the image displaying region is larger than a size of the text displaying region.

According to one or more embodiments of the present disclosure, in the video-based information displaying apparatus provided by the present disclosure, the information displaying module is specifically configured to:

display, in the image displaying region, an object image in the first target information, and display, in the text displaying region, other information except the object image.

According to one or more embodiments of the present disclosure, the video-based information displaying apparatus provided by the present disclosure further includes an image switching module, configured to:

when the number of object images on the image displaying region is at least two, receive a second switch triggering operation of the user in the image displaying region;
switch a first image displayed on the image displaying region to a second image.

According to one or more embodiments of the present disclosure, the video-based information displaying apparatus provided by the present disclosure further includes a thumbnail module, configured to:

display thumbnail information in the information displaying region, where the thumbnail information includes thumbnail images of the at least two pieces of target information;
the switching module is specifically configured to:
receive the first switch triggering operation of the user based on a triggering operation on a thumbnail image of the second target information in the thumbnail information.

According to one or more embodiments of the present disclosure, in the video-based information displaying apparatus provided by the present disclosure, the information displaying module is specifically configured to:

in response to a triggering operation of the user on a thumbnail image of the first target information in the thumbnail information, perform displaying of the first target information of the at least two pieces of target information in the information displaying region of the playback page of the video.

According to one or more embodiments of the present disclosure, the video-based information displaying apparatus provided by the present disclosure further includes a live module, configured to:

display a live switching control on the playback page;
in response to detecting that the user triggers the live switching control, display a live page associated with current target information, where the current target information is target information which is currently displayed on the playback page among the at least two pieces of target information.

According to one or more embodiments of the present disclosure, in the video-based information displaying apparatus provided by the present disclosure, the target information includes at least one of an object image, an object name, object characteristic information, object review information and object exchange information, where the number of object images is at least one.

According to one or more embodiments of the present disclosure, the present disclosure provides an electronic device, including:

a processor;
a memory, configured to store executable instructions for the processor;

where the processor is configured to read the executable instructions from the memory, and execute the instructions to implement any video-based information displaying method provided by the present disclosure.

According to one or more embodiments of the present disclosure, the present disclosure provides a computer-readable storage medium, where the storage medium has a computer program stored thereon, and the computer program is used to execute any video-based information displaying method provided by the present disclosure.

According to one or more embodiments of the present disclosure, an embodiment of the present disclosure also provides a computer program. The computer program is stored in a readable storage medium, and at least one processor of an electronic device can read the above computer program from the readable storage medium. The at least one processor executes the computer program to cause the electronic device to execute the video-based information displaying method provided by the embodiments of the present disclosure.

According to one or more embodiments of the present disclosure, an embodiment of the present disclosure further provides a computer program product including a computer program. When the computer program is executed by a processor, the video-based information displaying method provided by the embodiments of the present disclosure is implemented.

The above description is only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or equivalent features without departing from the above disclosed concept. For example, the above features and the technical features disclosed in the present disclosure (but not limited to) having similar functions are replaced with each other to form a technical solution.

In addition, although the operations are described in a specific order, this should not be understood as requiring these operations to be performed in the specific order or in a sequential order as shown. Under certain circumstances, multitasking and parallel processing may be advantageous. Similarly, although several specific implementation details are included in the above discussion, these should not be interpreted as limiting the scope of the present disclosure. Certain features that are described in the context of separate embodiments may also be implemented in combination in a single embodiment. On the contrary, various features described in the context of a single embodiment may also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are only exemplary forms for implementing the claims.

What is claimed is:

1. A video-based information displaying method, comprising:
   receiving an information display triggering operation of a user in a process of playing back a video;
   displaying first target information of at least two pieces of target information associated with the video in an information displaying region of a playback page of the video, wherein a size of the information displaying region is smaller than a size of the playback page;
   receiving a first switch triggering operation of the user, and switching the first target information displayed in the information displaying region to second target information of the at least two pieces of target information;
   wherein the method further comprises:
   displaying a live switching control on the playback page;
   in response to detecting that the user triggers the live switching control, displaying a live page associated with current target information, wherein the current target information is target information which is currently displayed on the playback page among the at least two pieces of target information, the live page is displayed after the playback page is closed.

2. The method according to claim 1, wherein the receiving the information display triggering operation of the user comprises:
   receiving the information display triggering operation based on a triggering operation of the user on a preset information displaying control on the playback page.

3. The method according to claim 1, further comprising:
   determining sizes and positions of an image displaying region and a text displaying region of the information displaying region, wherein a size of the image displaying region is larger than a size of the text displaying region.

4. The method according to claim 3, wherein the displaying the first target information of the at least two pieces of target information in the information displaying region of the playback page of the video comprises:
   displaying, in the image displaying region, an object image in the first target information, and displaying, in the text displaying region, other information except the object image;
   wherein the displaying, in the text displaying region, other information except the object image, further comprises:
   displaying, in the text displaying region, guarantee information and functional buttons, wherein the functional button comprises a buying button, a window, a customer service and a collecting button.

5. The method according to claim 3, further comprising:
   when the number of object images in the image displaying region is at least two, receiving a second switch triggering operation of the user in the image displaying region;
   switching a first image displayed in the image displaying region to a second image.

6. The method according to claim 1, further comprising:
   displaying thumbnail information in the information displaying region, wherein the thumbnail information comprises thumbnail images of the at least two pieces of target information;
   the receiving the first switch triggering operation of the user comprises:
   receiving the first switch triggering operation of the user based on a triggering operation of the user on a thumbnail image of the second target information in the thumbnail information.

7. The method according to claim 6, wherein the displaying the first target information of the at least two pieces of target information in the information displaying region of the playback page of the video comprises:

in response to a triggering operation of the user on a thumbnail image of the first target information in the thumbnail information, performing displaying of the first target information of the at least two pieces of target information in the information displaying region of the playback page of the video.

8. The method according to claim 1, wherein the target information comprises at least one of an object image, an object name, object characteristic information, object review information and object exchange information, wherein the number of object images is at least one.

9. The method according to claim 1, further comprising:
acquiring the at least two pieces of target information associated with the video.

10. A video-based information displaying apparatus, comprising:
a processor;
a memory, configured to store executable instructions for the processor;
wherein the processor is configured to read the executable instructions from the memory, the processor is configured to:
receive an information display triggering operation of a user in a process of playing back a video;
display first target information of at least two pieces of target information associated with the video in an information displaying region of a playback page of the video, wherein a size of the information displaying region is smaller than a size of the playback page;
receive a first switch triggering operation of the user, and switch the first target information displayed in the information displaying region to second target information of the at least two pieces of target information;
wherein the processor is further configured to:
display a live switching control on the playback page;
in response to detecting that the user triggers the live switching control, display a live page associated with current target information, wherein the current target information is target information which is currently displayed on the playback page among the at least two pieces of target information, the live page is displayed after the playback page is closed.

11. The apparatus according to claim 10, wherein the processor is configured to:
receive the information display triggering operation based on a triggering operation of the user on a preset information displaying control on the playback page.

12. The apparatus according to claim 10, wherein the processor is further configured to:
determine sizes and positions of an image displaying region and a text displaying region of the information displaying region, wherein a size of the image displaying region is larger than a size of the text displaying region.

13. The apparatus according to claim 12, wherein the processor is specifically configured to:
display, in the image displaying region, an object image in the first target information, and display, in the text displaying region, other information except the object image; and
wherein the display, in the text displaying region, other information except the object image further comprises:
display, in the text displaying region, guarantee information and functional buttons, wherein the functional button comprises a buying button, a window, a customer service and a collecting button.

14. The apparatus according to claim 12, wherein the processor is further configured to:
when the number of object images on the image displaying region is at least two, receive a second switch triggering operation of the user in the image displaying region;
switch a first image displayed on the image displaying region to a second image.

15. The apparatus according to claim 10, wherein the processor is further configured to:
display thumbnail information in the information displaying region, wherein the thumbnail information comprises thumbnail images of the at least two pieces of target information;
the processor is specifically configured to:
receive the first switch triggering operation of the user based on a triggering operation on a thumbnail image of the second target information in the thumbnail information.

16. The apparatus according to claim 15, wherein the processor is specifically configured to:
in response to a triggering operation of the user on a thumbnail image of the first target information in the thumbnail information, perform displaying of the first target information of the at least two pieces of target information in the information displaying region of the playback page of the video.

17. The apparatus according to claim 10, wherein the target information comprises at least one of an object image, an object name, object characteristic information, object review information and object exchange information, wherein the number of object images is at least one.

18. A non-transitory computer-readable storage medium, wherein the storage medium has a computer program stored thereon, and when a processor executes the computer program, the processor executes steps of:
receiving an information display triggering operation of a user in a process of playing back a video;
displaying first target information of at least two pieces of target information associated with the video in an information displaying region of a playback page of the video, wherein a size of the information displaying region is smaller than a size of the playback page;
receiving a first switch triggering operation of the user, and switching the first target information displayed in the information displaying region to second target information of the at least two pieces of target information;
displaying a live switching control on the playback page;
in response to detecting that the user triggers the live switching control, displaying a live page associated with current target information, wherein the current target information is target information which is currently displayed on the playback page among the at least two pieces of target information, the live page is displayed after the playback page is closed.

19. The non-transitory computer-readable storage medium according to claim 18, wherein the receiving the information display triggering operation of the user comprises:
receiving the information display triggering operation based on a triggering operation of the user on a preset information displaying control on the playback page.

* * * * *